Jan. 5, 1971        H. R. SPROUL        3,552,186
APPARATUS FOR MEASURING THE DEW POINT TEMPERATURE OF A GAS
Filed April 1, 1969
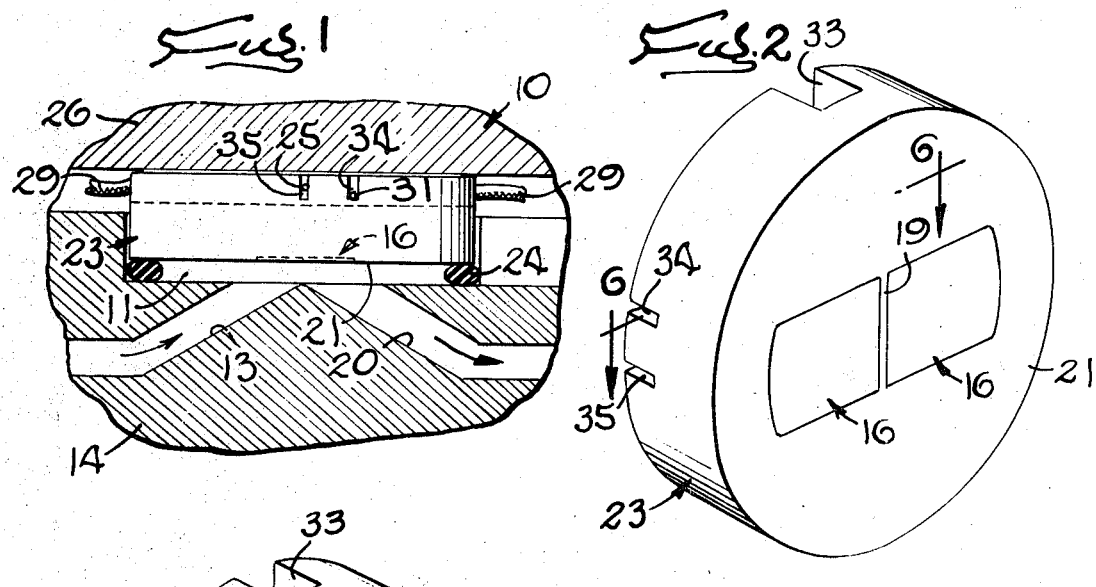
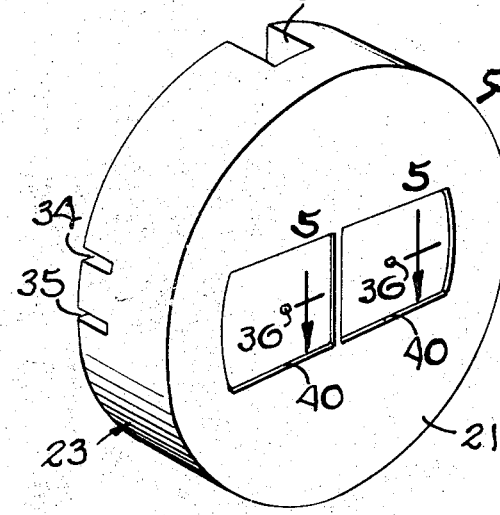
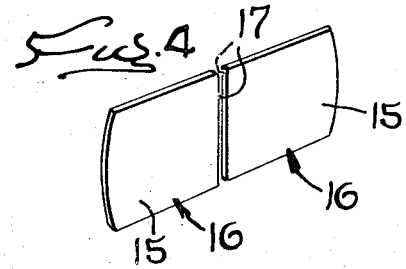
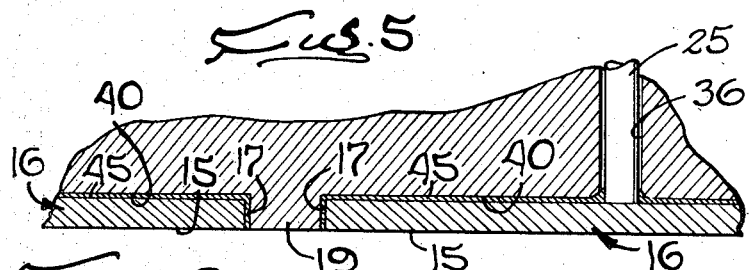
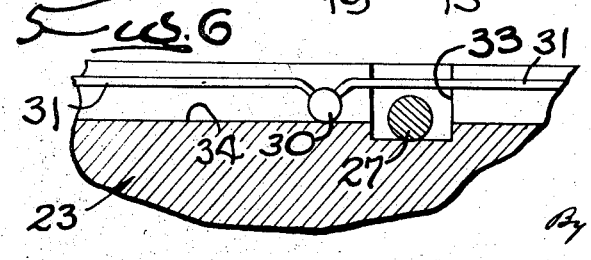
INVENTOR
Hugh R. Sproul
By Wolfe, Hubbard, Voit & Osann
ATTORNEYS 3,552,186
APPARATUS FOR MEASURING THE DEW POINT TEMPERATURE OF A GAS
Hugh R. Sproul, Rockton, Ill., assignor to Alco Standard Corporation, Valley Forge, Pa., a corporation of Ohio
Filed Apr. 1, 1969, Ser. No. 812,089
Int. Cl. G01n 25/04
U.S. Cl. 73—17      3 Claims

ABSTRACT OF THE DISCLOSURE

The dew point temperature of a gas is measured by a thermocouple operable to detect and signal the temperature of a sensing plate which is alternately cooled and heated to cause moisture in the gas to periodically condense between a pair of electrodes supported on one surface of the plate. The sensing plate is made of a highly thermally conductive material such as beryllium oxide to reduce the temperature differential between the condensing surface and the thermocouple and thereby improve the accuracy and sensitivity of the apparatus. To increase the service life of the apparatus, the electrodes are seated in recesses in the sensing plate and are flush with the condensing surface.

BACKGROUND OF THE INVENTION

This invention relates generally to apparatus for measuring the dew point temperature of a gas and more particularly to apparatus of the type having a sensing plate with a thermally conductive and electrically insulative condensing surface upon which is mounted a pair of spaced electrodes separated by a narrow gap. A sample of the gas to be measured is flowed across the condensing surface and the electrodes, and the plate is cooled until the gas reaches its dew point temperature to cause the moisture therein to form on the condensing surface within the gap and to cause current to flow across the electrodes. In response to such current flow, the plate is heated until the condensed moisture is evaporated and then is rapidly re-cooled to again condense the moisture between the electrodes. A thermal detector associated with the plate senses the temperature of the condensing surface and produces a signal indicative of such temperature, this being prevailing dew point temperature of the gas. Apparatus of this general type is disclosed in U.S. Pats. 2,815,305 and 3,031,881.

SUMMARY OF THE INVENTION

The primary aim of the present invention is to provide a new and improved dew point measuring apparatus of the above type which is more sensitive, accurate and rapidly responsive than prior apparatus of the same general character and which also is easier to maintain and more rugged and durable in service use. In large, improved sensitivity and accuracy are achieved by constructing the sensing plate and condensing surface of a material which is a much better thermal conductor than materials used heretofore so as to reduced the temperature differential between the condensing surface and the thermal detector and thus cause the signal produced by the detector to be more nearly representative of the true temperature of the condensing surface. Moreover, the material of high thermal conductivity shortens the time interval required to heat and cool the condensing surface and enables the apparatus to respond and cycle more rapidly to cause the temperature signal produced by the detector to remain more nearly constant when a gas with a given moisture content is being tested.

In a more specific sense, the invention resides in the novel formation of the sensing plate and condensing surface from highly thermally conductive beryllium oxide, and in the unique manner of securely attaching the electrodes to the beryllium oxide.

The durability of the apparatus is improved and its service life is increase by seating the electrodes in recesses in the sensing plate such that the exposed faces of the electrodes are flush with the condensing surfaces. In this way, there is less likelihood of the electrodes being torn away from the sensing plate when the condensing surface is rubbed manually for cleaning purposes and, in addition, the recessed electrodes enable better and easier cleaning of the surface and particularly of the electrode gap.

Other objects and advantages of the invention will become apparent from the following detailed description when taken in connection with the accompanying drawings.

BRIEF DESCRIPTION OF THE DRAWINGS

FIG. 1 is a fragmentary cross-section of a new and improved dew point measuring apparatus embodying the novel features of the present invention.

FIG. 2 is a perspective view of the sensing plate and electrodes shown in FIG. 1.

FIG. 3 is a perspective view of the sensing plate with the electrodes removed.

FIG. 4 is a perspective view of the electrodes.

FIG. 5 is an enlarged fragmentary cross-section taken substantially along the line 5—5 of FIG. 3.

FIG. 6 is an enlarged fragmentary cross-section taken substantially along the line 6—6 of FIG. 2.

DETAILED DESCRIPTION OF THE PREFERRED EMBODIMENT

As shown in the drawings for purposes of illustration, the invention is embodied in a device 10 (FIG. 1) for measuring the dew point temperature of a gas such as that used to form the protective atmosphere within a heat treating furnace (not shown). The importance of the dew point temperature is well known in the heat treating art. In the heating of metals surrounded by endothermic atmosphere, the chemical composition of the atmosphere determines whether the atmosphere will be reducing, neutral or oxidizing with respect to the metal being treated. Moreover, the chemical constituents of the atmosphere vary proportionately with the amount of water vapor in the atmosphere. Thus, by measuring the dew point, the chemical composition of the atmosphere can be determined. By controlling the dew point, the chemical composition can be regulated.

In many respects, the measuring device 10 is similar to those disclosed in the aforementioned patents to which reference is made for a more detailed description as to an exemplarly environment and auxiliary equipment with which the measuring device may be used. Generally, a sample of the gas to be tested is withdrawn from the furnace, is directed as a jet or stream into a chamber 11 (FIG. 1) through an inlet air passage 13 in a housing 14, and is flowed across the exposed faces 15 (FIGS. 4 and 5) of two electrodes 16 whose adjacent straight edges 17 define a narrow gap 19 (FIGS. 2 and 5) which in this instance is .015 inch wide and 9/32 inch long. The gas leaves the chamber by way of an exit air passage 20 (FIG. 1) formed through the housing.

As shown in FIGS. 2, 4 and 5, the electrodes 16 comprise thin and generally rectagular plates .003 inch thick of metal such as platinum foil supported on one face 21 of a sensing plate 23 of electrically insulative material which in turn is disposed within the chamber 11 and sealed to the housng 14 by a gasket 24 encircling the face 21. Insulated conductors 25 (FIG. 5) connected to the electrodes extend outwardly of the plate for a purpose to be described subsequently.

The device 10 alternately cools and heats the sample gas, measures the temperature at which condensation occurs, and produces a voltage signal corresponding in magnitude to such temperature, this being the dew point temperature. For those purposes, the face of the plate 23 opposite the electrodes 16 is disposed in heat conducting contact with a refrigerating device 26 (FIG. 1) capable of cooling the electrodes below the lowest dew point temperature which the sample gas ever attains. An electric heater 27 (FIG. 6) in the form of a coil of resistance wire is located within the plate and includes leads 29 (FIG. 1) which, together with the electrode conductors 25, are connceted across a voltage source of a control circuit (not shown) that may be of the type shown in either of the above-mentioned patents.

As long as the temperature of the electrodes 16 is above the prevailing dew point temperature of the gas sample being delivered to the chamber 11, there is no condensation or mist in the gap 19 on the face 21 and thus the impedance offered by the electrically insulative material of the plate 23 is at a maximum value such that there is a minimum flow of current across the gap and between the electrodes. As the electrodes are cooled progressively by the refrigerating device, moisture will condense out of the gas stream on the face 21 and in and around the gap 19 at the prevailing dew point temperature, of the gas, the face 21 with the included gap 19 thus constituting a condensing surface. When such condensation does occur, the gap impedance reduces appreciably to allow greater current flow across the gap and between the electrodes to produce an electrical signal which acts through the control circuit to energize the heater 27.

The effective capacity of the heater 27 to raise the temperature of the electrodes 16 and the condensing surface 21 is substantially greater than the cooling capacity of the refrigerating device 26. Accordingly, within a short interval after energization of the heater, the temperature of the electrodes and the gap 19 is raised above the prevailing dew point temperature of the sample gas thereby causing the condensate within the gap to be evaporated. The resulting increase in the gap impedance reduces the current flow across the electrodes to produce a signal de-energizing the heater. This initiates the cooling part of another cycle and, after a short interval, moisture again will condense in the gap to cause re-energization of the heater.

To sense and signal the temperature of the electrodes 16 and the gap 19, a thermal detector in the form of a thermocouple 30 (FIG. 6) with leads 31 is associated with the plate 23 at a position remote from the condensing surface 21 and is operable to measure the temperature of the plate and produce a voltage signal correlated in magnitude with the temperature. The voltage signal thus is indicative of the dew point temperature of the gas and is impressed upon the control circuit to effect recording of the temperature on a monitoring instrument (not shown) and/or to cause operation of apparatus (not shown) for changing the moisture content of the gas.

In accordance with the primary aspect of the present invention, the sensing plate 23 is made of a material which has significantly greater thermal conductivity than the materials of previous plates in order to establish better thermal conduction between the condensing surface 21 and the thermocouple 30 so that the temperature sensed and signaled by the themocouple will more nearly correspond to the true temperature of the condensing surface. The measuring device 10 thus is more sensitive and accurate and, in addition, the high thermal conductivity of the material of the plate shortens the time interval required to heat and cool the plate thereby to allow more rapid cycling of the measuring device and to cause the temperature signal produced by the thermocouple to remain more nearly constant for a gas of a given dew point.

In the preferred embodiment of the invention, the sensing plate 23 is formed as a cylindrical disc consisting essentially of highly thermally conductive beryllium oxide and preferably of a so-called "dense" beryllium oxide such as that sold by the American Lava Corporation under the trade designation Alsimag 754–L623. The plate 23 is approximately one inch in diameter and ¼ inch thick and is formed with a relatively wide groove 33 (FIGS. 2 and 6) which opens out of the surface of the plate opposite the condensing surface 21. The heater 27 is received within the groove and is cemented to the walls thereof. Spaced angularly from the groove 33 are two narrow grooves 34 and 35 whose bottoms are spaced about .20 inch from the condensing surface. The thermocouple is seated in the groove 34 in underlying relation wtih the electrodes 16 and is disposed in good conductive contact with the bottom of the groove. The conductors 25 of the electrodes are received in the groove 47 and are connected to the electrodes through small holes 36 (FIGS. 3 and 5) extending axially of the plate between the groove and the condensing surface.

As pointed out above, the beryllium oxide from which the sensing plate 23 is formed is an extremely good thermal conductor and thus the temperature differential existing between the condensing surface 21 and electrodes 16 and the thermocouple 30 is exceedingly small. In other words, heat is conducted readily from the condensing surface to the thermocouple with a minimum of thermal lag so that the temperature sensed and signaled by the thermocouple is more nearly the same as that of the condensing surface. As a result, the measuring device 10 is more accurate and also may be more easily and precisely calibrated with respect to its operating environment. That is, the signal impressed on the control circuitry by the thermocouple is more nearly representative of the true dew point temperature of the sample gas and thus fewer compensations need be made to the apparatus which responds to the signal. Also, with the decreased thermal lag through the beryllium oxide, the condensing surface and electrodes are cooled and heated quite rapidly by the refrigeration device 26 and the heater 27 such that the moiture in the gas is condensed in approximately one second after the heater is de-energized and then is evaporated from the gap 19 approximately ½ second after reenergization of the heater. Accordingly, the temperature of the plate fluctuates only within a few degrees, as for example one or two degrees Fahrenheit, and thus the temperature signal produced by the thermocouple remains relatively constant as long as the dew point temperature of the gas is constant.

In addition to being highly thermally conductive, the beryllium oxide is an extremely good electrical insulator and thus the electrical impedance between the electrodes 16 is high as long as the condensing surface 21 is dry and then reduces sharply when the sample gas is condensed. The beryllium oxide also is relatively non-porous and impervious to moisture so that excessive moisture and contamination from the gas does not accumulate in the material of the condensing surface and necessitate a longer heating cycle to evaporate the moisture. Finally, the beryllium oxide is comparatively hard and abrasive resistant and thus the condensing surface will not be scored and worn away by abrasive cleansers which are applied manually to the surface at frequent intervals to remove contamination.

While beryllium oxide is the preferred material for the sensing plate 23 and has performed with optimum success in service use, other materials which possess generally similar characteristics also will yield improved results. For example, a sensing plate consisting essentially of aluminum oxide ($Al_2O_3$) will produce greater accuracy and preciseness in the measuring device 10 than other materials used heretofore even though the thermal conductivity of aluminum oxide is somewhat lower than that of beryllium oxide. To realize most of the advantages of the invention, the sensing plate should consist essentially of a material having a thermal conductivity at 25° C. of at least .05 cal. cm./sec. cm.²° C., having a volume resistively at 25° C. of at least $1\times10^{10}$ ohm-cm., having a hardness of at least 300 on the Knoop Scale, and having a porosity rating of "impervious" by the Fuchsine Dye Test.

The present invention also contemplates mounting the electrodes 16 on the sensing plate 23 in a novel manner to facilitate cleaning of the electrodes and the condensing surface 21 and to increase the service life thereof. For these purposes, the electrodes are seated snugly in a pair of spaced recesses 40 (FIG. 3) opening out of the condensing surface and are disposed with their exposed faces 15 flush with the condensing surface and the gap 19. As a result, there is less danger of the recessed electrodes being engaged and torn away from the plate when the electrodes and condensing surface are rubbed manually during cleaning. With the electrodes disposed flush with the condensing surface, no edges or corners project from the surface and thus the electrodes and the condensing surface define a plane face which is capable of being rapidly, easily, and thoroughly cleaned.

As shown most clearly in FIGS. 3 and 5, the recesses 40 are spaced apart a distance equal to the width of the gap 19 and are separated by a narrow ridge 41 of the plate 23, the exposed face of such ridge defining the gap. The recesses correspond closely in size and shape to the electrodes 16 and thus the latter are retained very snugly within the recesses without any substantial moisture-collecting voids existing between the edges of the electrodes and the walls of the recesses. The depth of the recesses is such that the exposed faces 15 of the electrodes are flush with the condensing surface 21 and the gap 19 as shown in FIG. 5 when the electrodes are seated in the recesses.

Advantageously, the electrodes 16 are anchored rigidly to the plate 23 in a manner that insures that the electrodes will not work loose even after extended service use. Herein, such anchoring is achieved by metallizing the bottoms of the recesses 40 with a material which is compatible both with the beryllium oxide plate and the platinum electrodes. More particularly, an atomic bond is established between the bottoms of the recesses and a layer 45 (FIG. 5) of metallizing material such as molybdenum-manganese (Mo-Mn) by coating the surfaces of the recesses with a mixture of 3 parts molybdenum and 2 parts manganese dioxide ($MnO_2$) and by sintering the coated plate in a wet hydrogen atmosphere at a temperature of approximately 1600° C. The molybdenum-manganese layer 45 thus becomes firmly bonded to the beryllium oxide and forms a surface to which the platinum electrodes can be secured. Preferably, the electrodes are brazed to the layer 45 with a silver brazing material after the layer first has been coated with a film of nickel or copper to promote wetting. With the atomic bond between the beryllium oxide and the molybdenum-manganese layer 45 and with the silver braze between the layer and the electrodes, the latter remain anchored rigidly to the plate after repeated use and cleaning. Moreover, both the molybdenum-manganese and the silver brazing material are comparatively good thermal conductors and do not detrimentally affect the conduction of heat between the electrodes and the plate.

I claim as my invention:

1. Apparatus for detecting the dew point of a gas and comprising a plate having a condensing surface, a pair of spaced recesses formed in said condensing surface and separated from one another by a narrow ridge of said plate having an exposed face flush with and forming part of said condensing surface, a pair of electrodes corresponding generally in size and shape to the recesses seated snugly in the latter and having exposed faces flush with said condensing surface, means on said plate remote from said condensing surface for detecting and signaling changes in the temperature of said condensing surface, said plate and condensing surface consisting essentially of beryllium oxide to establish good thermal conductivity between said condensing surface and said detecting means while insulating said electrodes electrically from one another, metallizing means in the bottoms of said recesses and atomically bonded to said beryllium oxide for enabling attachment of the electrodes to the plate, and means securing said electrodes to said metallizing means.

2. Apparatus for detecting the dew point of a gas and comprising a plate having a condensing surface made of a material selected from the group consisting of beryllium oxide and aluminum oxide, a pair of spaced recesses formed in said condensing surface and separated by a narrow ridge of said material having an exposed face flush with said condensing surface, and electrodes seated in said recesses and having exposed faces flush with said condensing surface and the exposed face of said ridge.

3. Apparatus as defined in claim 2 in which the electrodes and the recesses substantially correspond in size and shape whereby the electrodes may be seated snugly in the recesses without leaving any substantial voids between the electrodes and the edges of the recesses.

References Cited

UNITED STATES PATENTS

| | | | |
|---|---|---|---|
| 2,435,895 | 2/1948 | McIlvaine | 73—17 |
| 2,815,305 | 12/1957 | Ipsen | 73—17X |
| 3,074,143 | 1/1963 | Smith | 117—123X |
| 3,293,901 | 12/1966 | Van Scoyoc | 73—17 |
| 3,324,212 | 6/1967 | Paulley | 264—63 |

FOREIGN PATENTS

| | | | |
|---|---|---|---|
| 1,372,649 | 8/1964 | France | 73—17 |

JAMES J. GILL, Primary Examiner

C. E. SNEE III, Assistant Examiner

U.S. Cl. X.R.

73—29